(12) United States Patent
Kubota

(10) Patent No.: US 6,941,070 B2
(45) Date of Patent: Sep. 6, 2005

(54) FLASH DEVICE AND LENS-FITTED PHOTO FILM UNIT WITH BUILT-IN FLASH DEVICE

(75) Inventor: Takeshi Kubota, Minami-Ashigara (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/856,767

(22) Filed: Jun. 1, 2004

(65) Prior Publication Data

US 2004/0240873 A1 Dec. 2, 2004

(30) Foreign Application Priority Data

May 30, 2003 (JP) ........................................ 2003-155317

(51) Int. Cl.[7] .............................................. G03B 15/05
(52) U.S. Cl. ...................................................... 396/206
(58) Field of Search ................................. 396/205, 206; 315/241 P

(56) References Cited

U.S. PATENT DOCUMENTS 6,339,679 B1   1/2002   Aratame et al. ................ 396/6
6,404,990 B2 * 6/2002   Isozaki et al. ............... 396/206

* cited by examiner

Primary Examiner—W. B. Perkey
(74) Attorney, Agent, or Firm—Young & Thompson

(57) ABSTRACT

A charging circuit includes an oscillation transformer and an oscillation transistor. The oscillation transistor oscillates at a secondary current returned from a secondary coil in the charging circuit. The oscillation transistor increases/decreases a primary current, which flows from a battery to a primary coil, and flows the secondary current through the secondary coil to charge a main capacitor. The oscillation transistor, which satisfies the following conditions, is used: a DC current gain $h_{FE1}$ is 500±10 when a collector-emitter voltage $V_{CE}$ is 2V and a collector current $I_C$ is 0.5 A, and a DC current gain $h_{FE2}$ is 290±10 when the collector-emitter voltage $V_{CE}$ is 2V and the collector current $I_C$ is 5 A.

7 Claims, 6 Drawing Sheets

FLASH DEVICE AND LENS-FITTED PHOTO FILM UNIT WITH BUILT-IN FLASH DEVICE

BACKGROUND OF THE INVENTION

1. Field of the Invention

The present invention relates to a flash device for improving a battery life and suitable for reusing, and a lens-fitted photo film unit incorporating the flash device.

2. Description Related to the Prior Art

Various types of lens-fitted photo film units pre-loaded with unexposed films are sold. There is a type of a lens-fitted photo film unit having a built-in flash device, so that exposures can be taken indoors or in a dark place such as during nighttime. When taking a flash photography by using the lens-fitted photo film unit, a charging switch is turned on by operating a flash operating member prior to photography. Thereby, the flash device is actuated to charge a main capacitor.

The flash device of the lens-fitted photo film unit utilizes a charging circuit which includes an oscillation transformer having a primary and a secondary coils, an oscillation transistor, and a rectification diode as main parts. The oscillation transistor oscillates at a secondary current, which is returned from the secondary coil, to increase/decrease a primary current which flows from the battery to the primary coil. Thereby, high-voltage alternating current is generated through the secondary coil. The secondary current, which flows through the secondary coil, is rectified and output to charge the main capacitor.

The battery is incorporated in a unit body of the lens-fitted photo film unit along with the flash device. The flash device is actuated by using the battery as a power supply. Therefore, the battery is consumed if the user forgets to turn off the charging switch. If the charging switch remains ON for a period of time equivalent to battery life, charging of the flash device cannot be carried out properly. Accordingly, flash emission cannot be carried out. A battery life, for instance, is defined as elapsed time T which is measured as follows. Measurement of elapsed time T starts concurrently with turning on the charging switch for charging. The main capacitor is discharged by emitting flash light once an hour while keeping the charging switch turned on. Charging time T1 is measured every time flash light is emitted. Charging time T1 is between the instant when the flash is emitted and the instant when the main capacitor reaches a predetermined voltage (the voltage which allows the flash emission). Thus, the battery is consumed by continuing charging along with the flash emission. Accordingly, charging time T1 becomes longer. Elapsed time T, which is time elapsed until charging time T1 becomes longer than the predetermined time (for instance, 30 seconds), is defined as the battery life.

Extending the battery life can reduce an influence caused by not turning off the charging switch. For instance, U.S. Pat. No. 6,339,679, the battery life is extended by setting a higher resistance on a path which supplies a base current of the oscillation transistor from the battery. The above reference discloses that the battery life extends as the resistance becomes higher.

A used lens-fitted photo film unit is collected, and the flash device is removed from the used lens-fitted photo film unit. Thereafter, the flash device is reused.

When reusing, it is preferable to increase the resistance of the flash circuit in order to extend the battery life. However, a DC current gain of the oscillation transistor needs to be suitable for the resistance. Therefore, if the resistance is changed, the oscillation transistor also needs to be changed in accordance with the resistance.

It becomes unnecessary to replace the oscillation transistor by setting the resistance within a range suitable for the DC current gain of the oscillation transistor. However, in that case, it becomes necessary to measure the DC current gain and select the resistor having the resistance based on the measured DC current gain. As a result, the reuse cannot be carried out efficiently. It will increase the cost for reusing the flash device.

Further, if there are oscillation transistors with different resistance, it becomes necessary to sort out the oscillation transistor with proper DC current gain based on the resistance. Therefore, it will also increase reusing cost.

The above-mentioned problems can be solved by predetermining the DC current gain so as to use the oscillation transistor irrespective of the resistance. However, it narrows an applicable range of the DC current gain, so that sorting of the oscillation transistor becomes necessary. As a result, it will increase the manufacturing cost.

High-grade camera such as a compact camera or a single-lens reflex camera incorporates a charging control circuit for monitoring the charging voltage to stop charging when charging is completed. The charging control circuit checks the charging voltage at proper intervals or in response to a shutter release operation after completion of charging. When the charging voltage is insufficient, a charging operation is carried out to enable the flash emission. Thereby, unnecessary consumption of the battery is prevented.

However, the above charging control circuit is complicated and expensive. A low cost is one of the characteristics of the lens-fitted photo film unit. Therefore, it is not practical to provide the above circuit in the lens-fitted photo film unit.

SUMMARY OF THE INVENTION

An object of the present invention is to provide a flash device which can extend the battery life without an increase in cost.

Another object of the present invention is to provide the flash device which is suitable for reusing.

Further object of the present invention is to provide a lens-fitted photo film device which incorporates the above-mentioned flash device.

To achieve the above objects, the flash device of the present invention includes a charging circuit for charging a main capacitor by boosting a primary voltage of a battery to a high secondary voltage and a discharge tube for emitting flash light by discharging charges stored in the main capacitor. The charging circuit includes an oscillation transformer having at least a primary coil and a secondary coil, which are inductively coupled, and an oscillation transistor connected to the oscillation transformer. The primary coil of the oscillation transformer is connected to the battery, and the secondary coil is connected to the main capacitor.

The oscillation transistor oscillates at a current returned from the secondary coil and increases/decreases a current which flows through the primary coil to generate the secondary voltage in the secondary coil. When a collector-emitter voltage $V_{CE}$ of the oscillation transistor is 2V and a collector current $I_C$ of the oscillation transistor is 0.5 A, a DC current gain is defined as $h_{FE1}$. When the collector-emitter voltage $V_{CE}$ of the oscillation transistor is 2V and the collector current $I_C$ of the oscillation transistor is 5.0 A, a DC current gain is defined as $h_{FE2}$.

When extending the battery life mainly by reducing the leakage current, it is preferable to use the oscillation transistor with a DC current gain $h_{FE1}$, which ranges from 330 to 430, and a DC current gain $h_{FE2}$, which ranges from 220 to 240. At that time, it is preferable that $h_{FE1}-h_{FE2} \leq 190$.

When extending the battery life by reducing the leakage current and improving the charging efficiency, it is preferable to use the oscillation transistor with a DC current gain $h_{FE1}$, which ranges from 490 to 510 and a DC current gain $h_{FE2}$, which ranges from 280 to 300.

When extending the battery life mainly by improving the charging efficiency, it is preferable to use the oscillation transistor with a DC current gain $h_{FE1}$, which ranges from 640 to 700 and a DC current gain $h_{FE2}$, which ranges from 360 to 420.

Further, the lens-fitted photo film unit of the present invention includes the above-mentioned flash device incorporated in the unit body which is loaded with unexposed photo film and has a switching member for switching on/off the charging circuit from outside the unit body.

According to the present invention, it becomes easy to evaluate a suitable transistor as the oscillation transistor by setting a DC current gain $h_{FE1}$, and the DC current gain $h_{FE2}$. Therefore, it is advantageous in reusing.

An amount of the collector current $I_C$ of the oscillation transistor is equivalent to the base current multiplied by the DC current gain $h_{FE}$. Therefore, the amount of the secondary current at the beginning of charging is increased by increasing the DC current gain $h_{FE2}$ in a high-current flowing area of the collector current. Thereby, charging time is reduced.

After charging is completed, charging voltage decreases due to internal leakage of the main capacitor. Therefore, a supply of the secondary current is continued to compensate the loss of the charging voltage. In that case, the leakage current is reduced by decreasing the DC current gain $h_{FE1}$, so that the consumption of the battery is reduced after charging is completed.

Thus, the battery life is extended by using the oscillation transistor, which has proper setting of the DC current gain $h_{FE1}$ in a low-current flowing area of the collector current and the DC current gain $h_{FE2}$ in the high-current flowing area of the collector current.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
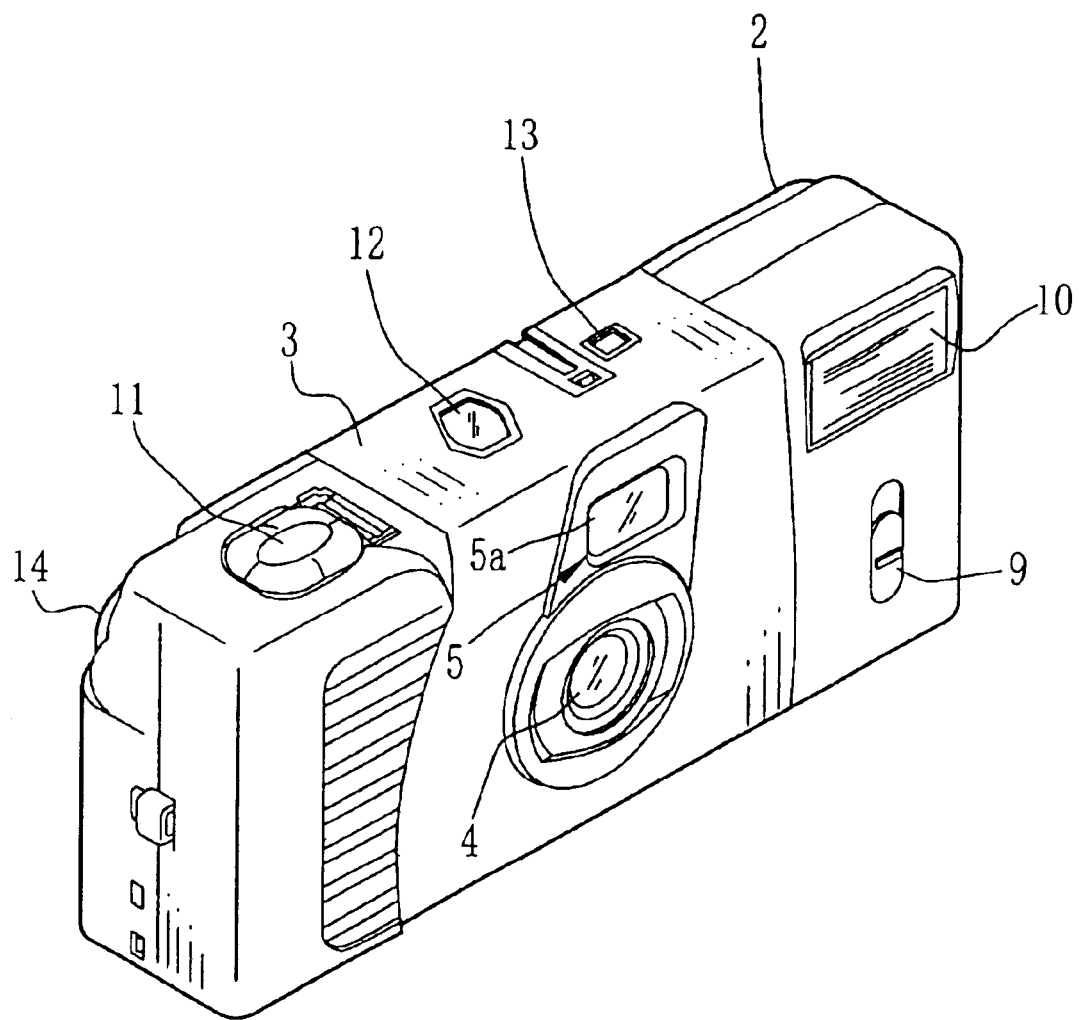
FIG. 1 is a perspective view of a lens-fitted photo film unit with a built-in flash device.

Referring to FIG. 1, a lens-fitted photo film unit with a built-in flash device (hereinafter referred to as a lens-fitted photo film unit) includes a unit body 2 and a sticker belt 3 which partly covers the unit body 2. A shutter mechanism, a film-feed mechanism, and various photographic mechanisms such as a flash device are built into the unit body 2. The flash device will be described later. An unexposed photo film and a cartridge, which contains an exposed photo film, are previously loaded in the unit body 2 during manufacturing.

A taking lens 4, an objective window 5a of a viewfinder 5, a flash operating knob 9, and a flash emitter 10 are provided on the front of the unit body 2. A shutter release button 11, a frame counter 12, and a light guide 13 are provided on a surface of the unit body 2. The frame counter 12 indicates the number of remaining available frames. The light guide 13 indicates that the flash device is ready to emit flash light.

A winder wheel 14, which is rotated after each exposure, is disposed on the back of the unit body 2. An eyepiece window (not shown) of the viewfinder 5 is disposed directly behind the objective window 5a. The sticker belt 3 is attached to the center of the unit body 2. The taking lens 4, the viewfinder 5, the frame counter 12, and the light guide 13 appear through respective openings provided in the sticker belt 3.

Whether to emit flash light during the exposure can be selected by sliding the flash operating knob 9. The flash operating knob 9 is slidable between an OFF position and an ON position. The OFF position is shown in FIG. 1. The flash operating knob 9 is set in the ON position by sliding up the flash operating knob 9 from the OFF position.

When the flash operating knob 9 is slid up to the ON position, the flash device actuates to start charging in order to emit flash light and a flash emission is permitted. After charging, an exposure is taken by pressing the shutter release button 11. Flash light is emitted from the flash emitter 10 to an object in synchronism with the exposure. When the flash operating knob 9 is slid to the OFF position, charging is stopped and the flash emission is disabled irrespective of whether the charging is completed.

Figure 2:
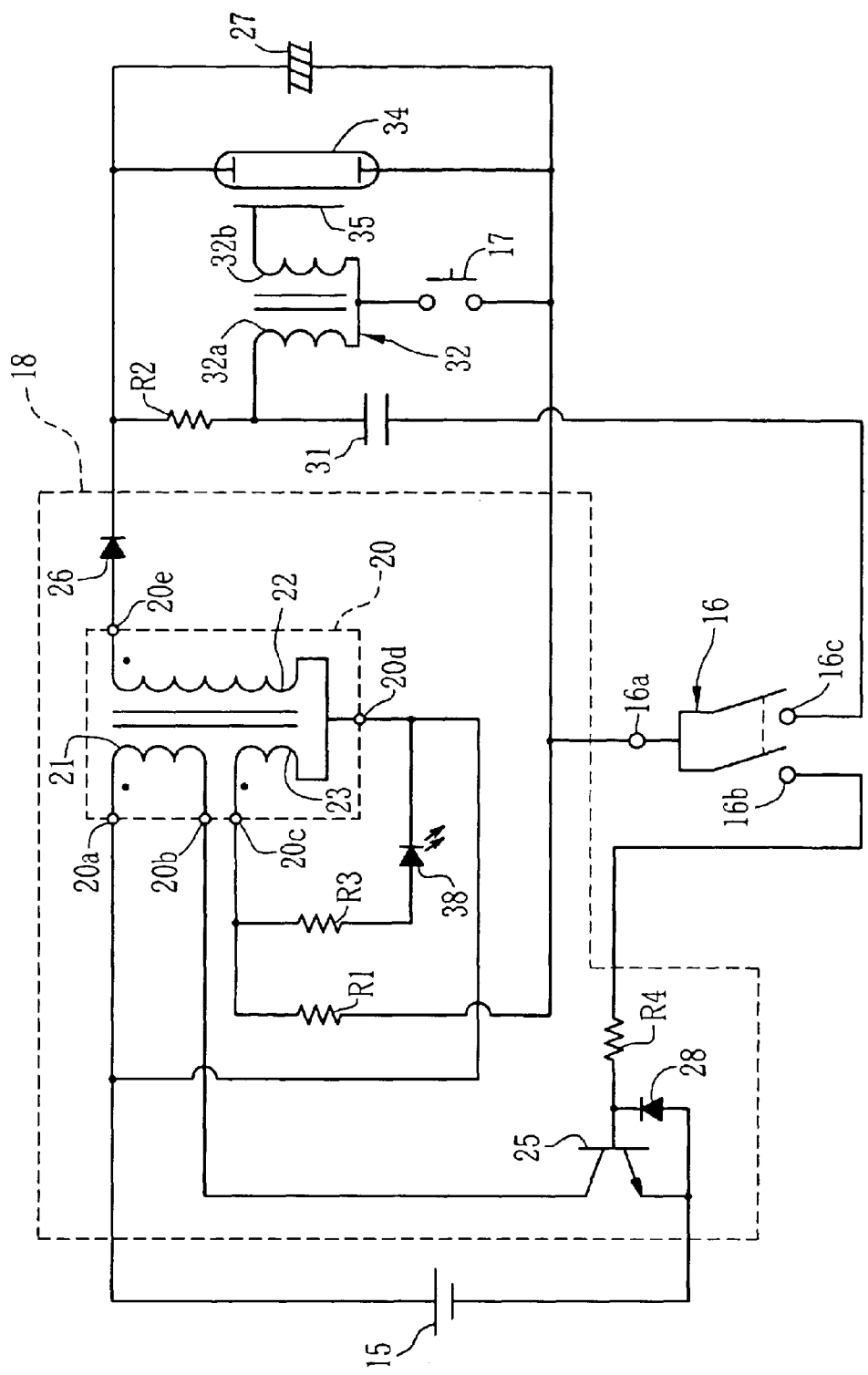
FIG. 2 is a circuit diagram illustrating a flash circuit in a flash device.

Referring to FIG. 2, a battery 15 is used as a power supply for the flash device which is built into the above-mentioned lens-fitted photo film unit. The battery 15 is loaded in the lens-fitted photo film unit during manufacturing. An AA-cell battery with a nominal output voltage of 1.5V is used as the battery 15.

A flash switch 16 has first to third contacts, 16a–16c. The flash switch 16 acts as a charging switch for controlling charging operation and as an emission select switch for selecting whether to emit flash light. The flash switch 16 is turned on/off in accordance with the flash operating knob 9. The flash switch 16 is turned on by sliding the flash operating knob 9 to the ON position. The flash switch 16 is turned off by sliding the flash operating knob 9 to the OFF position. The flash switch 16 connects each contact 16a to 16c when the flash switch 16 is turned on, and disconnect each contact when the flash switch 16 is turned off.

A sync switch 17 is linked with the shutter mechanism. The sync switch 17 is turned on when the shutter blade opens fully. Flash light is emitted when the synch switch 17 is turned on.

A charging circuit 18 includes an oscillation transformer 20, an oscillation transistor 25, and a rectification diode 26 as main parts. The oscillation transformer 20 is formed of a primary coil 21, a secondary coil 22 and a tertiary coil 23, which are inductively coupled. A first to fifth terminals 20a–20e are provided in the oscillation transformer 20. The first terminal 20a is connected to one end of the primary coil 21. The second terminal 20b is connected to the other end of the primary coil 21. The third terminal 20c is connected to one end of the tertiary coil 23. The fourth terminal 20d is connected to the other end of the tertiary coil 23 and one end of the secondary coil 22. The fifth terminal 20e is connected to the other end of the secondary coil 22.

The first terminal 20a of the oscillation transformer 20 is connected to a positive electrode of the battery 15. The second terminal 20b is connected to a collector terminal of the oscillation transistor 25. The third terminal 20c is connected to the first contact 16a of the flash switch 16 via a resistance R1. The fourth terminal 20d is connected to the positive electrode of the battery 15. The fifth terminal 20e is connected to an anode of the rectification diode 26. A cathode of the rectification diode 26 is connected to an end of a main capacitor 27. The other end of the main capacitor 27 is connected to the first contact 16a of the flash switch 16.

The oscillation transistor 25 is an n-p-n transistor. An emitter terminal of the oscillation transistor 25 is connected to a negative electrode of the battery. A base terminal is connected to the second contact 16b of the flash switch 16 via a resistance R4. As previously mentioned, the collector terminal of the oscillation transistor 25 is connected to the primary coil 21. The oscillation transistor 25 passes a collector current through the primary coil 21 in accordance with the base current. The base terminal of the oscillation transistor 25 is connected to the cathode of a diode 28. The anode of the diode 28 is connected to the emitter terminal of the oscillation transistor 25.

The charging circuit 18, which is connected in the above-mentioned configuration, constitutes a well-known blocking oscillation circuit. In the charging circuit 18, the oscillation transistor 25 increases/decreases the primary current, which flows from the battery 15 to the primary coil 21, to generate high-voltage alternating current through the secondary coil 22. The high-voltage alternating current is rectified by the rectification diode 26 and output from the charging circuit 18. Thereby, the main capacitor 27 is charged. The charging circuit 18 actuates when the flash switch 16 is turned on, and stops when the flash switch 16 is turned off.

An end of a trigger capacitor 31 is connected to the cathode of the rectification diode 26 via a resistance R2. The other end of the trigger capacitor 31 is connected to the third contact 16c of the flash switch 16. The trigger coil 32 is formed of a primary coil 32a and a secondary coil 32b which are inductively coupled. An end of the primary coil 32a is connected to an end of the trigger capacitor 31 (which is on the resistance R2 side). The other end of the primary coil 32a is connected to the first contact 16a of the flash switch 16 via the sync switch 17 along with an end of the secondary coil 32b. The other end of the secondary coil 32b is connected to a trigger electrode 35 provided close to a flash discharge tube 34.

The sync switch 17, the trigger capacitor 31, and the trigger coil 32, which are connected in the above-mentioned configuration, constitute a trigger circuit for starting the flash emission. When the flash switch 16 is turned on, the secondary current output from the charging circuit 18 charges the trigger capacitor 31 along with the main capacitor 27.

When the sync switch 17 is turned on in accordance with turning on the flash switch 16, the trigger capacitor 31 discharges to feed a discharge current through the primary coil 32a. Thereby, a trigger voltage generated in the secondary coil 32b is applied to the flash discharge tube 34 via the trigger electrode 35. When the flash switch 16 is turned off, the trigger capacitor 31 does not discharge even if the sync switch 17 is turned on. Therefore, the trigger voltage is not applied to the flash discharge tube 34.

The flash discharge tube 34 is connected between the terminals of the main capacitor 27. When the trigger voltage is applied to the flash discharge tube 34, charge stored in the main capacitor 27 is discharged within the flash discharge tube 34 to emit flash light. The flash discharge tube 34 is disposed at the back of the flash emitter 10. Flash light is emitted from the discharge tube 34 via the flash emitter 10 to the object.

A light-emitting diode (an LED) 38 is provided to indicate the completion of charging to a user. A cathode of the LED 38 is connected to the forth terminal 20d. An anode of the LED 38 is connected to the third terminal 20c via a resistance R3. The LED 38 lights up due to a change in a voltage between the third and fourth terminals 20c–20d in response to a change in a charging voltage across the main capacitor 27 while the charging circuit 18 is actuated. The LED 38 lights up brightly when the charging voltage across the main capacitor 27 reaches a predetermined charging voltage (which is a minimum possible voltage to emit flash light).

The LED 38 is disposed under the light guide 13. The user can check the completion of charging through the light guide 13 when the LED 38 lights up. In addition, it is also possible to use a conventional neon tube for indicating the completion of charging.

The above-mentioned flash device has the same circuit configuration and the same circuit constant as the lens-fitted photo film unit manufactured and sold by the applicant except for DC current gains of the oscillation transistor which will be described later. However, it becomes possible to extend battery life of a conventional flash device only by replacing the oscillation transistor. Therefore, it is also advantageous to replace the oscillation transistor in collecting and reusing a used lens-fitted photo film unit with the battery life of the flash device extended.

Figure 3:
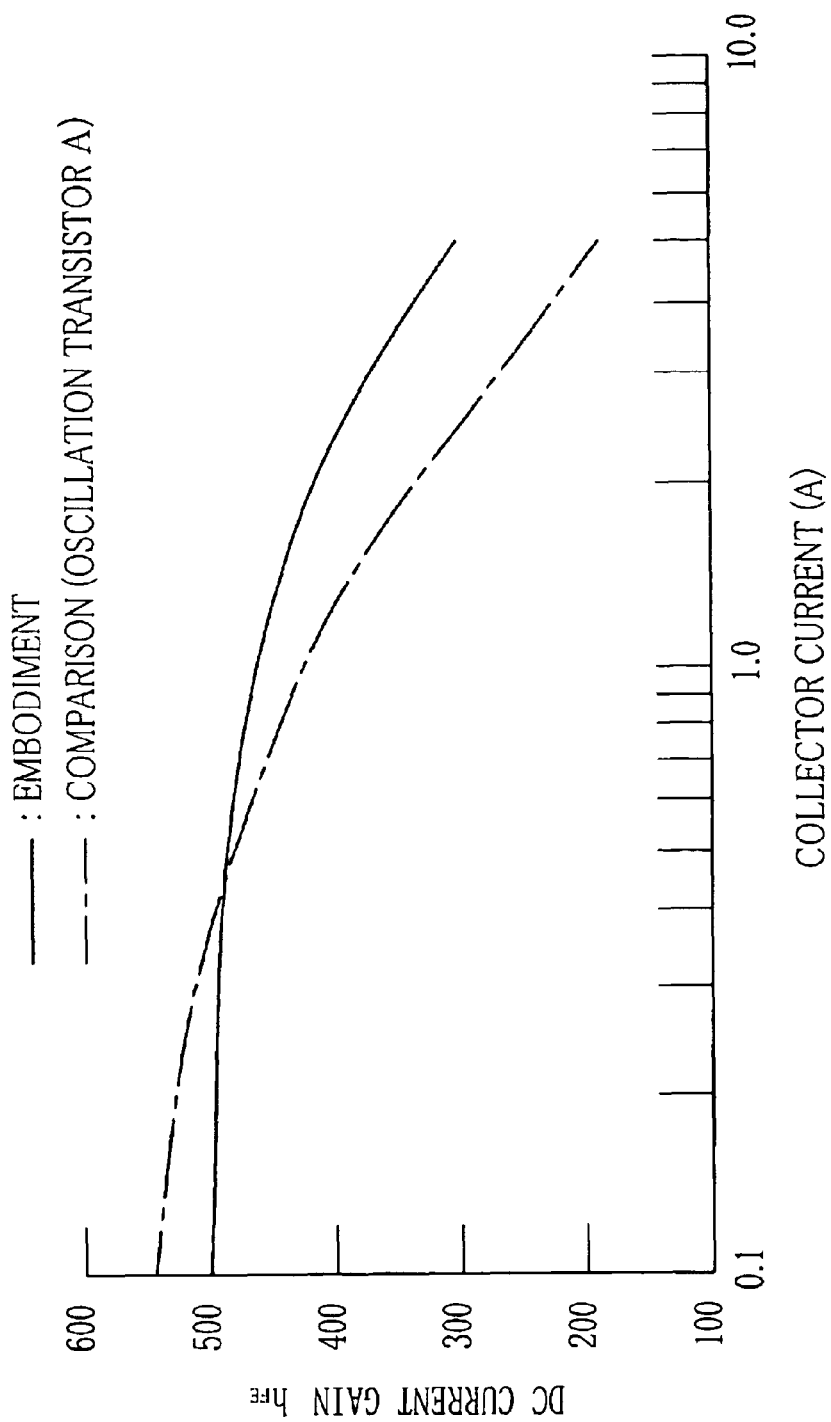
FIG. 3 is a graph illustrating a relationship between a DC current gain and a collector current of an oscillation transistor.

Referring to FIG. 3, a relationship between the collector current $I_C$ and the DC current gain $h_{FE}$ is described in a solid line when a collector-emitter voltage $V_{CE}$ of the oscillation transistor 25 is 2V. The oscillation transistor 25, which satisfies the following conditions, is used: a DC current gain (hereinafter referred to as $h_{FE1}$) is 500±10 when the collector-emitter voltage $V_{CE}$=2V and the collector current $I_C$=0.5 A, and a DC current gain (hereinafter referred to as $h_{FE2}$) is 290±10 when the collector-emitter voltage $V_{CE}$=2V and the collector current $I_C$=5 A.

A leakage current is reduced by using the oscillation transistor which has the above DC current gains $h_{FE1}$ and $h_{FE2}$. The battery life is also extended by improving charging efficiency. For instance, "2SC5486 T23" (produced by Isahaya Electronics Corporation) and "2SC2687S" (produced by ROHM) can be used as the oscillation transistor 25.

The oscillation transistor 25 has a smaller DC current gain in a low-current flowing area of the collector current, and has a larger DC current gain in a high-current flowing area of the collector current compared to the above oscillation transistor of the conventional flash device. A relationship between the collector current $I_C$ of the oscillation transistor in the conventional flash device and the DC current gain $h_{FE}$ is indicated by alternate long and short dashed lines in FIG. 3.

The operation of the above configuration is described. When taking the exposure, the photo film is wound up for one frame by rotating the winder wheel 14. The shutter is set at a charged position in response to the rotation of the winder wheel 14. Whether to emit flash light is selected by operating the flash operating knob 9.

When taking the exposure with flash light, the flash switch 16 is also turned on by sliding the flash operating knob 9 to the ON position. When the flash switch 16 is turned on, the current from the battery 15 passes through the oscillation transistor 25 as a base current to actuate the charging circuit 18. In other words, the base current flows in a path including the positive electrode of the battery 15, the tertiary coil 23, the resistance R1, the flash switch 16 (across the first contact 16a and the second contact 16b), the resistance R4, the oscillation transistor 25 (across the base and the emitter), and the negative electrode of the battery 15 to turn on the oscillation transistor 25.

When the oscillation transistor 25 is turned on, the collector current of the oscillation transistor 25 passes through the positive electrode of the battery 15, the primary coil 21, the oscillation transistor 25 (across the collector and the emitter), and the negative electrode of the battery 15.

As shown in FIG. 3, an amount of DC current gain $h_{FE}$ of the oscillation transistor 25 corresponds to that of the collector current. The amount of the collector current corresponds to that of the base current of the oscillation transistor 25. It is expressed by an equation, the amount of the collector current $I_C$=the amount of the base current×$h_{FE}$. That is, the collector current amplified by the DC current gain $h_{FE}$, which corresponds to the base current, flows.

When the collector current passes through the oscillation transistor 25, that is, when the primary current passes through the primary coil 21, an electromotive force is generated in the secondary coil 22 to flow the secondary current. The secondary current flows in a path including the fifth terminal 20e of the oscillation transistor 25, the rectification diode 26, the main capacitor 27, the flash switch 16 (across the first contact 16a and the second contact 16b), the resistance R4, the oscillation transistor (across the base and the emitter), the battery 15, and the fourth terminal 20d of the oscillation transformer 20.

The main capacitor 27 is charged by the flow of the secondary current. At the same time, the secondary current passes through the base terminal of the oscillation transistor 25 as a feedback current so that the amount of the base current increases. In response to the increase of the base current amount, the amount of the collector current, that is, the amount of the primary current increases to oscillate. In that way, while the amount of the primary current increases, the electromotive force is generated in the secondary coil 22 to flow the secondary current. Thereby, the main capacitor 27 is charged.

As the amount of the collector current increases until the oscillation transistor 25 is saturated, that is, when the primary current becomes constant, a counter electromotive force is generated in each coil 21 to 23 in order to maintain the strength of a magnetic flux by the effect of mutual induction within the oscillation transformer 20. The counter electromotive force generated in the primary coil 21 directs the current to flow in a path including the first terminal 20a, the battery 15, the diode 28, the oscillation transistor 25 (across the base and the emitter), and the second terminal 20b. As a result, the oscillation transistor 25 is turned off.

After the counter electromotive force stops, the flow of the base current resumes from the battery 15. Thereafter, the oscillation transistor 25 oscillates by going through the above-mentioned steps, and the main capacitor 27 is charged by the secondary current which flows during the oscillation. Thus, the main capacitor 27 is charged and the charging voltage of the main capacitor 27 is increased by repeating the above-mentioned steps. A part of the secondary current passes through the trigger capacitor 31 to charge the trigger capacitor 31.

When the main capacitor 27 reaches the predetermined charging voltage to enable flash emission, the LED 38 lights up. Thereby, the user can check whether flash light is ready for emission through the light guide 13.

Charging of the main capacitor 27 is continued after reaching the predetermined charging voltage until the main capacitor 27 reaches a convergent voltage. The convergent voltage is determined by, for instance, the circuit constant of the charging circuit 18.

Charging is completed when the main capacitor 27 reaches the convergent voltage. Thereafter, the secondary current flows so as to compensate the loss of the charging voltage due to leakage inside the main capacitor 27, to charge the main capacitor 27. The secondary current is returned as the base current of the oscillation transistor 25 to oscillate repeatedly in order to flow the collector current (that is, the primary current) in accordance with the base current. The collector current of the oscillation transistor 25 becomes the leakage current.

When taking an exposure, lighting of the LED 38 is checked to see whether flash light is ready for emission. Thereafter, the framing is decided through the viewfinder 5 and the shutter release button 11 is depressed. When the shutter release button 11 is depressed, the shutter mechanism is actuated to open/close the shutter blade. The sync switch 17 is turned on when the shutter blade opens fully.

When the sync switch 17 is turned on, the trigger capacitor 31 is discharged since the flash switch 16 has been turned on. The discharge current passes through the primary coil 32a of the trigger coil 32, and the trigger voltage occurred to the secondary coil 32b is provided to the flash discharge tube 34 via the trigger electrode 35. Thereby, the charge stored in the main capacitor 27 is discharged in the flash discharge tube 34 to emit flash light. Flash light is emitted from the flash emitter 10 to the object.

When the flash emission is completed, the main capacitor 27 is charged by the charging circuit 18 which has been in action. After charging, flash photography can be carried out by going through the above-mentioned steps.

When flash light is not used, the flash switch 16 is turned off by sliding the flash operating knob 9 to the OFF position. The flash operating knob 9 can be slid to the OFF position before or after the completion of charging of the main capacitor 27.

When the flash switch 16 is turned off, the base current is not fed to the oscillation transistor 25 so that the charging circuit 18 stops. As a result, charging of the main capacitor 27 also stops. Further, when the flash switch 16 is turned off, the trigger capacitor 31 does not discharge even if the synch switch 17 is turned on. Therefore, flash light is not emitted even if the main capacitor is charged to the predetermined charging voltage.

When the flash switch 16 is kept in the ON position, the charging circuit 18 continues the action after charging is completed as previously mentioned. As a result, the battery 15 is consumed by the flow of the leakage current. The leakage current has an amount equal to that of the base current of the oscillation transistor 15 multiplied by $h_{FE}$. However, since charging is completed, the amount of the secondary current, which is returned as the base current of the oscillation transistor 25, is small. A low DC current gain $h_{FE}$ is applied in the low current flowing area, so that the amount of the collector current (that is, the amount of the leakage current), which flows after completion of charging, becomes small. Thus, the loss of the battery 15 is reduced.

In the high current flowing area, a high DC current gain $h_{FE}$ is applied. Therefore, the amount of the primary current becomes larger at the beginning of charging due to the high collector current. As a result, charging efficiency is improved by charging the main capacitor 27 with a high secondary current. Thus, charging time is reduced when the battery 15 is not consumed. The flash device of the present invention enables charging to be completed within predetermined time even if, for instance, the battery 15 is consumed to a certain extent that a conventional flash device cannot complete charging within predetermined time. Accordingly, the battery life is extended.

The battery life can be extended just by changing the oscillation transistor without changing the flash circuit configuration or the circuit constant. Therefore, the recycling suitability of the lens-fitted photo film unit is not adversely affected. Further, the transistor is evaluated by using the DC current gains $h_{FE1}$ and $h_{FE2}$. As a result, it is easy to evaluate a suitable transistor for the flash device of the lens-fitted photo film unit.

A result of measurement of the battery life in the above-mentioned configuration is described. As previously described, flash light is emitted once an hour while keeping the flash switch 16 turned on to continue charging. Charging time required for the main capacitor 27 to reach the minimum possible emission voltage after the flash emission is measured. Charging time becomes longer as the battery deteriorates. The battery life is time elapsed until charging time reaches predetermined charging time (30 seconds) after turning on the flash switch.

In above measurement, the oscillation transistor 25 with the DC current gain $h_{FE}$, which is depicted in the solid line in the FIG. 3, is used. Further, as a comparison, a flash device with an oscillation transistor with the DC current gain $h_{FE}$, which is conventionally used in the same circuit configuration, (hereinafter referred to as oscillation transistor A) is measured. The DC current gain $h_{FE}$ of the oscillation transistor A is indicated by alternate long and short dashed lines in FIG. 3. An average conventional oscillation transistor has DC current gain $h_{FE1}$ of 560±10 and DC current gain $h_{FE2}$ of 260±10. Other specifications of each part are the same as those of the conventional flash device, and are shown in the table 1.

TABLE 1

| Resistance R1 | 15 kΩ |
|---|---|
| Resistance R2 | 4.7 MΩ |
| Resistance R3 | 15 Ω |
| Resistance R4 | 100 Ω |
| Main capacitor | 95 μF, Voltage-proof 360 V |
| Trigger capacitor | 0.022 μF, Voltage-proof 400 V |
| Oscillation transistor | EE −8.5 core |
| | Number of turns — Primary coil: 6 turns |
| | Secondary coil: 1470 turns |
| | Tertiary coil: 9.5 turns |
| Trigger coil | Number of turns — Primary coil: 14.5 turns |
| | Secondary coil: 400 turns |

Figure 4:
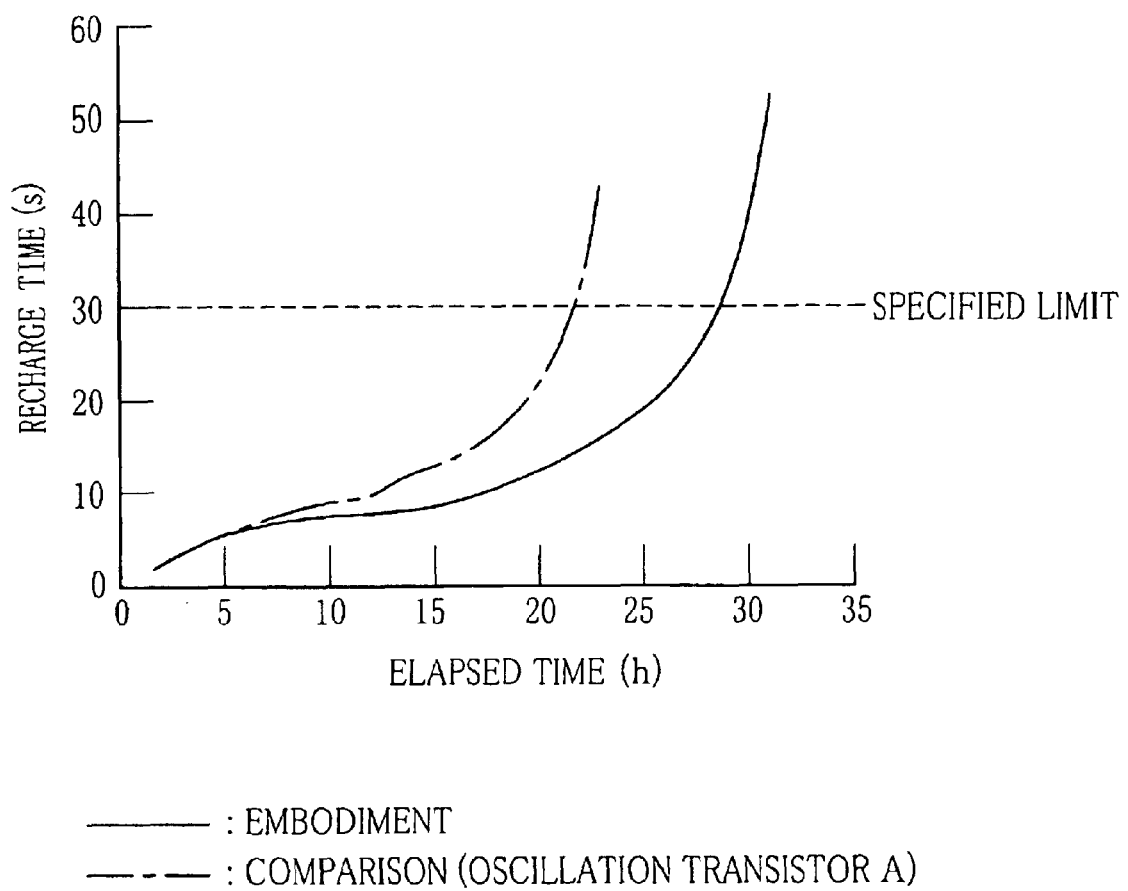
FIG. 4 is a graph illustrating a change in charging time in battery life measurement.

A result of measurement of the charging time is depicted in FIG. 4. In FIG. 4, the horizontal axis is time elapsed since the flash switch 16 has been turned on. The vertical axis is the charging time necessary to reach the minimum possible emission voltage after the flash emission. Further, the result of measurement of the embodiment is depicted in FIG. 4 in the solid line. The result of the comparison is depicted in the alternate long and short dashed lines.

As described in a graph of FIG. 4, the battery life of the comparison, which is a flash device using the oscillation transistor A, is approximately 22 hours. However, the battery life of the embodiment is approximately 29 hours. Thus, the battery life is extended by 30%.

Figure 5:
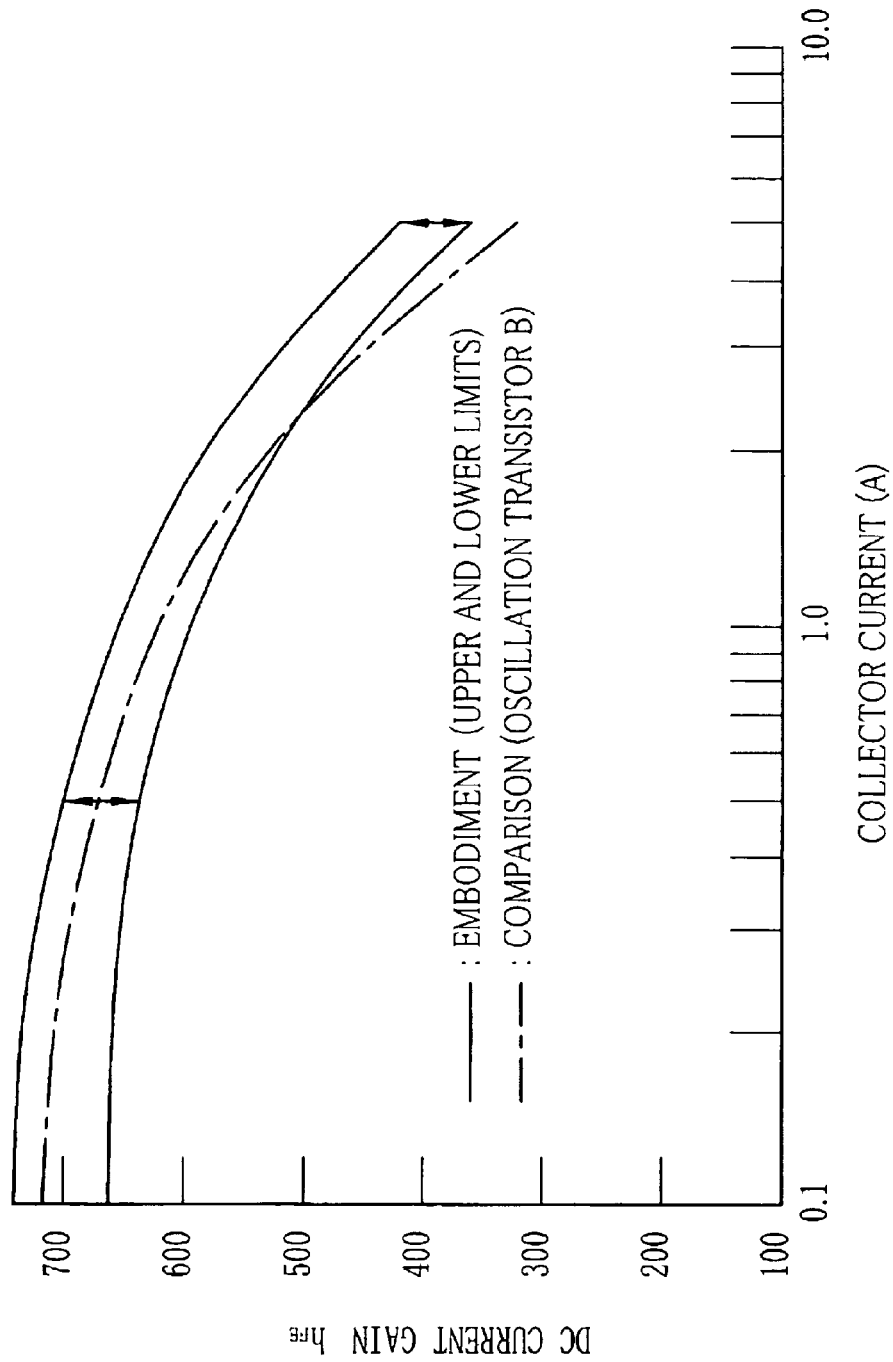
FIG. 5 is an example illustrating an increase in the battery life by increasing the charging efficiency.

FIG. 5 illustrates an example of extending the battery life with emphasis on improving the charging efficiency. An embodiment illustrated in FIG. 5 is just the same as that in FIG. 4 except for the oscillation transistor which has different DC current gains $h_{FE1}$, and $h_{FE2}$.

As a range is illustrated in FIG. 5, the oscillation transistor 25 with the DC current gain $h_{FE1}$, which ranges from 640 to 700, and the DC current gain $h_{FE2}$, which ranges from 360 to 420, is used. The charging efficiency is improved by setting higher DC current gain $h_{FE2}$. The battery is consumed by a large amount; however, it enables flash light to emit within predetermined time.

The DC current gain $h_{FE1}$ increases as the DC current gain $h_{FE2}$ increases. When the DC current gain $h_{FE1}$ increases excessively, the battery life may be shortened due to increased leakage current, the oscillation transistor 25 may be broken down or deteriorated at an elevated temperature, and/or the convergent voltage of the main capacitor 27 may become higher than required. As described above, it is preferable to select a transistor with the DC current gain $h_{FE1}$, which ranges from 640 to 700, and the DC current gain $h_{FE2}$, which ranges from 360 to 420 as the oscillation transistor 25.

FIG. 5 illustrates a relationship between the DC current gain $h_{FE}$ of the conventional oscillation transistor B with a similar range of the DC current gain $h_{FE}$ to the embodiment and the collector current in alternate long and short dashed lines. The DC current gain $h_{FE}$ of the conventional oscillation transistor B corresponds to the upper limit of the range which is allowed by the conventional flash device due to variations in the DC current gain $h_{FE}$ in the conventional flash device.

Figure 6:
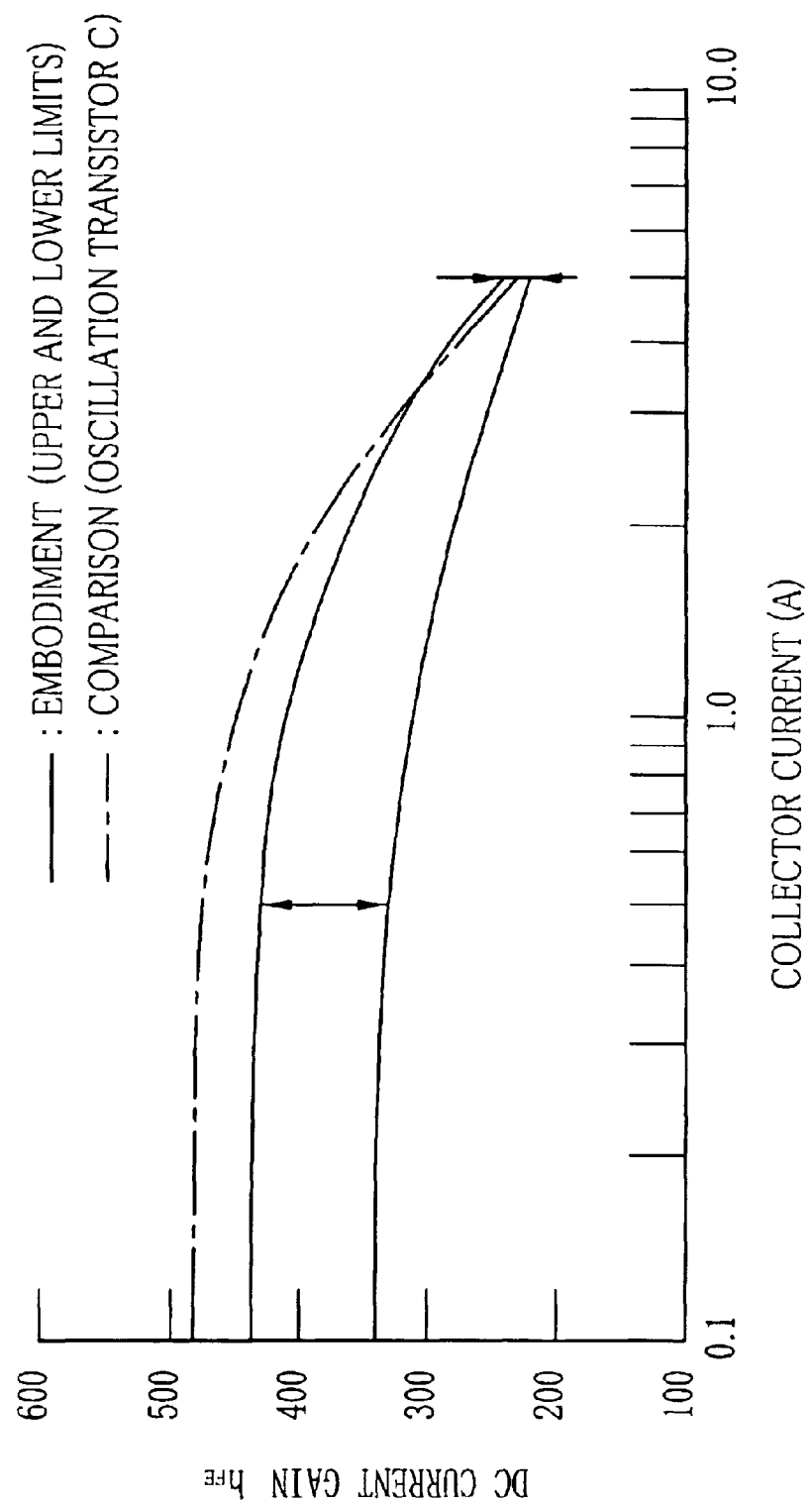
FIG. 6 is an example illustrating an increase in the battery life by reducing a leakage current.

FIG. 6 illustrates an example of extending the battery life with emphasis on reducing the leakage current. The embodiment is just the same as the first embodiment except that the oscillation transistor uses different DC current gains $h_{FE1}$ and $h_{FE2}$.

In this embodiment, as an example is shown in FIG. 6, the DC current gain $h_{FE1}$, ranges from 330 to 430, and the DC current gain $h_{FE2}$ ranges from 220 to 240. The leakage current is effectively reduced by setting the lower DC current gain $h_{FE1}$ in order to retard the deterioration of the battery after completion of charging.

As the DC current gain $h_{FE1}$ decreases, the DC current gain $h_{FE2}$ decreases. As the DC current gain $h_{FE2}$ decreases excessively, the charging efficiency is reduced. As a result, the battery life may be shortened, the operation of the oscillation transistor 25 may become unstable at a low temperature, and/or the desirable charging voltage may not be achieved. As described above, it is preferable to select a transistor with the DC current gain $h_{FE1}$, which ranges from 330 to 430, and the DC current gain $h_{FE2}$, which ranges from 220 to 240, as the oscillation transistor 25.

In FIG. 6, a relationship between a conventional oscillation transistor C with the similar range of DC current gain $h_{FE1}$ to the embodiment and the collector current is illustrated in alternate long and short dashed lines. The DC current gain $h_{FE}$ of the oscillation transistor C corresponds to a lower limit of the range which is allowed by the conventional flash device due to the variations of the DC current gain $h_{FE}$ in the conventional flash device.

The above embodiments show few examples of circuit configuration and the circuit constant of the resistance and the capacitor. The present invention can be applied to similar circuit configuration and circuit constant to the above embodiments. The DC current gain $h_{FE}$ of the oscillation transistor can be changed appropriately in accordance with the circuit configuration and the circuit constant using the above-mentioned method of extending the battery life.

In each embodiment, the flash device built into the lens-fitted photo film unit is described as an example. However, the present invention can be applied to the flash device built into a compact camera or a digital camera, and a flash device attached to a camera.

Although the present invention has been described with respect to the preferred embodiment, the preset invention is not to be limited to the above embodiment but, on the contrary, various modifications will be possible to those skilled in the art without departing from the scope of claims appended hereto.

What is claimed is:

1. A flash device including a charging circuit for charging a main capacitor by boosting a primary voltage of a battery to a high secondary voltage and a discharging tube for emitting flash light by discharging charges stored in said main capacitor, said charging circuit comprising:

an oscillation transformer having at least a primary coil and a secondary coil that are inductively coupled, said primary coil being connected to said battery, said secondary coil being connected to said main capacitor;

an oscillation transistor connected to said oscillation transformer, said oscillation transistor oscillating at a current returned from said secondary coil and increasing/decreasing a current from said battery to said primary coil to generate said secondary voltage in said secondary coil, said oscillation transistor satisfying the following conditions;

$330 \leq h_{FE1} \leq 430$ $220 \leq h_{FE2} \leq 240$ wherein, $h_{FE1}$ is a DC current gain when a collector-emitter voltage $V_{CE}$ of said oscillation transistor is 2V and a collector current $I_C$ of said oscillation transistor is 0.5 A, $h_{FE2}$ is a DC current gain when said collector-emitter voltage $V_{CE}$ of said oscillation transistor is 2V and said collector current $I_C$ of said oscillation transistor is 5.0 A.

2. A flash device as recited in claim 1, wherein said oscillation transistor satisfies the following condition;

$h_{FE1} - h_{FE2} \leq 190$

3. A lens-fitted photo film unit comprising a flash device as claimed in claim 1, being incorporated in a unit body loaded with unexposed photo film and having a switching member for switching on/off said charging circuit from outside said unit body.

4. A flash device including a charging circuit for charging a main capacitor by boosting a primary voltage of a battery to a high secondary voltage, and a discharging tube for emitting flash light by discharging charges stored in said main capacitor, said charging circuit comprising:

an oscillation transformer having at least a primary coil and a secondary coil that are inductively coupled, said primary coil being connected to said battery, said secondary coil being connected to said main capacitor;

an oscillation transistor connected to said oscillation transformer, said oscillation transistor oscillating at a current returned from said secondary coil and increasing/decreasing a current from said battery to said primary coil to generate said secondary voltage in said secondary coil, said oscillation transistor satisfying the following conditions;

$490 \leq h_{FE1} \leq 510$ $280 \leq h_{FE2} \leq 300$ wherein, $h_{FE1}$ is a DC current gain when a collector-emitter voltage $V_{CE}$ of said oscillation transistor is 2V and a collector current $I_C$ of said oscillation transistor is 0.5 A, $h_{FE2}$ is a DC current gain when said collector-emitter voltage $V_{CE}$ of said oscillation transistor is 2V and said collector current $I_C$ of said oscillation transistor is 5.0 A.

5. A lens-fitted photo film unit comprising a flash device as claimed in claim 4, being incorporated in a unit body loaded with unexposed photo film and having a switching member for switching on/off said charging circuit from outside said unit body.

6. A flash device including a charging circuit for charging a main capacitor by boosting a primary voltage of a battery to a high secondary voltage, and a discharging tube for emitting flash light by discharging charges stored in said main capacitor, said charging circuit comprising:

an oscillation transformer having at least a primary coil and a secondary coil that are inductively coupled, said primary coil being connected to said battery, said secondary coil being connected to said main capacitor;

an oscillation transistor connected to said oscillation transformer, said oscillation transistor oscillating at a current returned from said secondary coil and increasing/decreasing a current from said battery to said primary coil to generate said secondary voltage in said secondary coil, said oscillation transistor satisfying the following conditions;

$640 \leq h_{FE1} \leq 700$ $360 \leq h_{FE2} \leq 420$ wherein, $h_{FE1}$ is a DC current gain when a collector-emitter voltage $V_{CE}$ of said oscillation transistor is 2V and a collector current $I_C$ of said oscillation transistor is 0.5 A, $h_{FE2}$ is a DC current gain when said collector-emitter voltage $V_{CE}$ of said oscillation transistor is 2V and said collector current $I_C$ of said oscillation transistor is 5.0 A.

7. A lens-fitted photo film unit comprising a flash device as claimed in claim 6, being incorporated in a unit body loaded with unexposed photo film and having a switching member for switching on/off said charging circuit from outside said unit body.

* * * * *